United States Patent
Murakami et al.

(10) Patent No.: US 6,747,786 B2
(45) Date of Patent: Jun. 8, 2004

(54) OPTICAL DEFLECTOR AND OPTICAL DEFLECTOR ARRAY

(75) Inventors: Kenzi Murakami, Hino (JP); Hiroshi Miyajima, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/317,548

(22) Filed: Dec. 12, 2002

(65) Prior Publication Data

US 2003/0117687 A1 Jun. 26, 2003

(30) Foreign Application Priority Data

Dec. 21, 2001 (JP) ........................................ 2001-390217

(51) Int. Cl.$^7$ .............................................. G02B 26/00
(52) U.S. Cl. ........................................ 359/291; 359/290
(58) Field of Search ................................ 359/290, 291, 359/295

(56) References Cited

U.S. PATENT DOCUMENTS

| | | | |
|---|---|---|---|
| 4,317,611 A | 3/1982 | Petersen | |
| 5,554,851 A | 9/1996 | Hirai et al. | |
| 6,147,790 A | * 11/2000 | Meier et al. | 359/291 |
| 6,404,534 B1 | * 6/2002 | Chin et al. | 359/295 |
| 6,438,282 B1 | * 8/2002 | Takeda et al. | 385/16 |
| 6,600,591 B2 | * 7/2003 | Anderson et al. | 359/291 |
| 6,603,591 B2 | * 8/2003 | Mori | 359/295 |
| 6,614,581 B2 | * 9/2003 | Anderson | 359/295 |
| 2003/0123125 A1 | * 7/2003 | Little | 359/290 |

FOREIGN PATENT DOCUMENTS

JP 2001-116696 4/2001

\* cited by examiner

*Primary Examiner*—Ricky Mack
(74) *Attorney, Agent, or Firm*—Scully, Scott Murphy & Presser (57) ABSTRACT

Movable plates which are supported by an opposite substrate and which include a reflection surface are attached between elastic members in a longitudinal direction as a first direction. The movable plates are rocked with respect to the opposite substrate using a second direction crossing at right angles to the first direction as a rock axis. The opposite substrate is disposed opposite to the surface opposite to the reflection surface of the movable plates, and a first convex portion which contacts the movable plates in a maximum deflection angle of the movable plate is disposed in the opposite substrate. The movable plates are driven by the elastic members so that the plates can rock into first and second deflection positions to contact the first convex portion.

18 Claims, 6 Drawing Sheets

OPTICAL DEFLECTOR AND OPTICAL DEFLECTOR ARRAY

CROSS-REFERENCE TO RELATED APPLICATIONS

This application is based upon and claims the benefit of priority from the prior Japanese Patent Applications No. 2001-390217, filed Dec. 21, 2001, the entire contents of which are incorporated herein by reference.

BACKGROUND OF THE INVENTION

1. Field of the Invention

The present invention relates to an optical deflector and optical deflector array which use a micro machine technique to deflect light.

2. Description of the Related Art

Figure 1A:
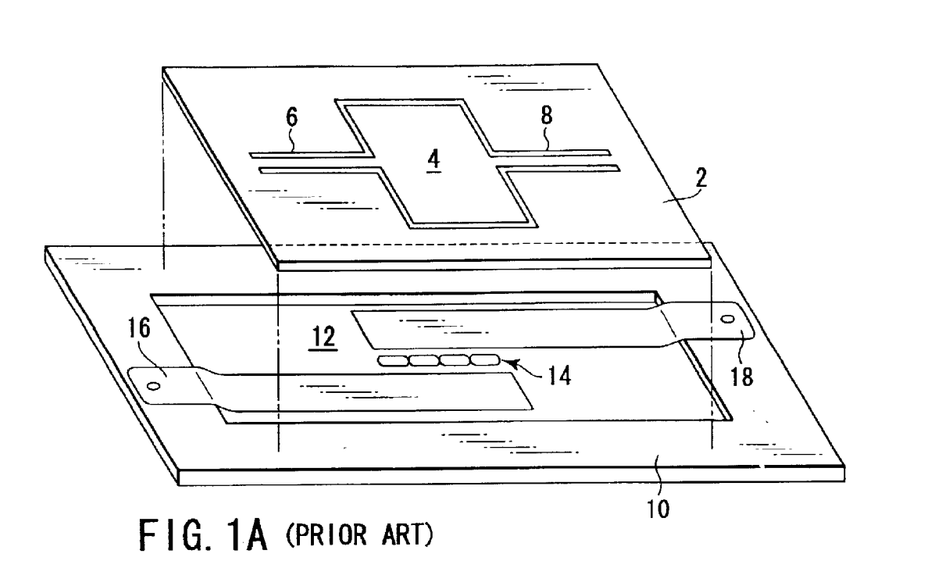
FIGS. 1A and 1B are diagrams showing constitution examples of a conventional optical deflector.

In recent years, an optical deflector has been noted which uses a MEMS technique. This technique is disclosed, for example, in U.S. Pat. No. 4,317,611. As shown in FIG. 1A, the optical deflector includes a rotor portion 4 formed of silicon and torsion bars 6, 8 disposed on a rotation shaft of the rotor portion 4. Moreover, the rotor portion 4 is connected to a semiconductor plate portion 2 via the torsion bars 6, 8. These rotor portion 4, torsion bars 6, 8, and semiconductor plate portion 2 are formed integrally from the same silicon substrate. The semiconductor plate portion 2 functions as a support member which supports the rotor portion 4.

On the other hand, a substrate (hereinafter referred to as an electrode substrate) 10 on which an electrode for driving is formed under the substrate which forms the rotor portion 4. In the electrode substrate 10, an annular concave portion 12 is formed around the rotor portion 4 and torsion bars 6, 8. Moreover, in the annular concave portion 12, a continuously formed island-shaped portion 14 is positioned on the rotation shaft of the rotor portion 4.

Furthermore, two conductive elements for driving (hereinafter referred to as driving electrodes) 16, 18 are formed symmetrically with the island-shaped portion 14 as an axis. The driving electrodes 16, 18 are formed to extend to ends of the electrode substrate 10 beyond the annular concave portion 12. The electrode substrate 10 is bonded to the semiconductor plate portion 2 to constitute an optical deflection apparatus.

The optical deflection apparatus constituted as described above is driven by an electrostatic attraction force by voltages applied to two driving electrodes 16, 18. Therefore, a deflection angle of the rotor portion 4 is determined by a difference of voltages applied to both the electrodes 16, 18. Moreover, the rotor portion 4 contacts the island-shaped portion 14 by the electrostatic attraction force, and is deflected using a contact surface with the island-shaped portion 14 as a base point of rotation.

Figure 1B:
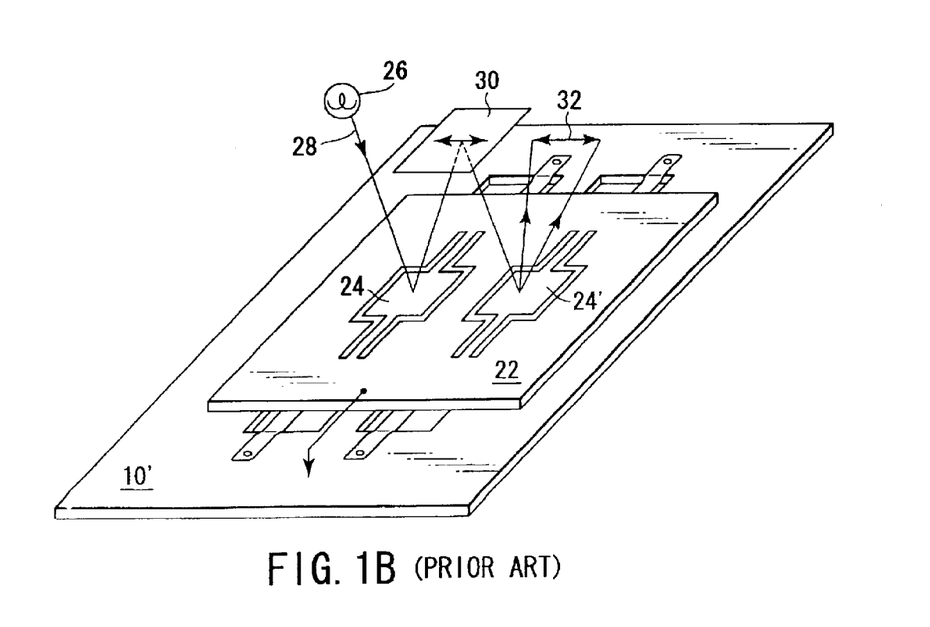

Moreover, in the above-described publication, application using the optical deflection apparatus is also disclosed. As shown in FIG. 1B, the optical deflection apparatus is constituted of an optical deflector and an electrode substrate 10'. The optical deflector includes a semiconductor plate portion 22 in which two rotor portions 24, 24' on the same substrate are formed in parallel in a direction crossing at right angles to the rotation shaft. Moreover, the electrode substrate 10' includes a fixed mirror 30 for deflecting a light 28 from a light source 26 reflected by the first rotor portion 24 to the second rotor portion 24'.

That is, in this constitution, two rotor portions 24, 24' formed in parallel can be used to increase a deflection angle as shown by an arrow 32.

Moreover, in the above-described publication, there are also described two rotor portions arranged so that the rotation shafts cross at right angles to each other. This has an advantage that the light can two-dimensionally be deflected via the fixed mirror.

However, in the above-described optical deflector, since a torsion bar portion for connection to the semiconductor plate portion is disposed on the rotation shaft, rotors cannot be arranged in a rotation shaft direction without any gap. Therefore, the above-described optical deflector is not suitable for a constitution in which the rotors are densely arranged in the rotation shaft direction.

For example, for use as a micro optical deflection element in a scanning type optical apparatus described in Jpn. Pat. Appln. KOKAI Publication No. 2001-116696, it is necessary to arrange the rotor portions in a direction parallel to the rotation shaft without any gap. This is because the micro optical deflection element has a purpose of introducing the divided lights into a plurality of optical detection apparatuses with an arbitrary wavelength width. When an interval from the adjacent rotor portion is broad, spectral characteristics are adversely affected. Moreover, the rotor portions cannot be arranged in the rotation shaft direction without any gap in the above-described conventional optical deflector. Therefore, there is a problem that the spectral characteristics are deteriorated.

BRIEF SUMMARY OF THE INVENTION

Therefore, an object of the present invention is to provide optical deflectors which can densely be arranged in a rotation shaft direction.

Another object of the present invention is to provide an optical deflector array using optical deflectors which can densely be arranged in the rotation shaft direction.

To achieve the objects, according to one aspect of the present invention, there is provided an optical deflector comprising:

a movable plate having a reflection surface and an opposite surface opposite to the reflection surface;

a support member including a confronting substrate which confronts the opposite surface of the movable plate;

at least one elastic member having two ends, one end being supported by the support member and the other end being attached to the movable plate, and extending in a first direction extending from the one end to the other end; and driving member for driving the movable plate to rock with respect to the support member with using a second direction normal to the first direction as a rock axis, the confronting substrate having a contact area which defines a maximum deflection angle of the movable plate and restricts the rocking movement of the movable plate within the maximum deflection angle, and the contact area having a first and a second deflection position with which the movable plate is brought into contact when the driving member applies a driving force to the movable plate.

According to another aspect of the present invention, there is provided an optical deflector array wherein a plurality of the above-mentioned optical deflectors are arranged in the second direction parallel to the rock axis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A through 3E show individual detailed constitutions of the optical deflector of FIG. 2.

FIGS. 5A through 5D show individual detailed constitutions of the optical deflector according to a second embodiment of the present invention, FIGS. 6A through 6E show constitutions of the optical deflector according to a third embodiment of the present invention.

DETAILED DESCRIPTION OF THE INVENTION

Embodiments of the present invention will be described hereinafter with reference to the drawings.

A first embodiment of the present invention will first be described with reference to FIGS. 2 through 4.

Figure 2:
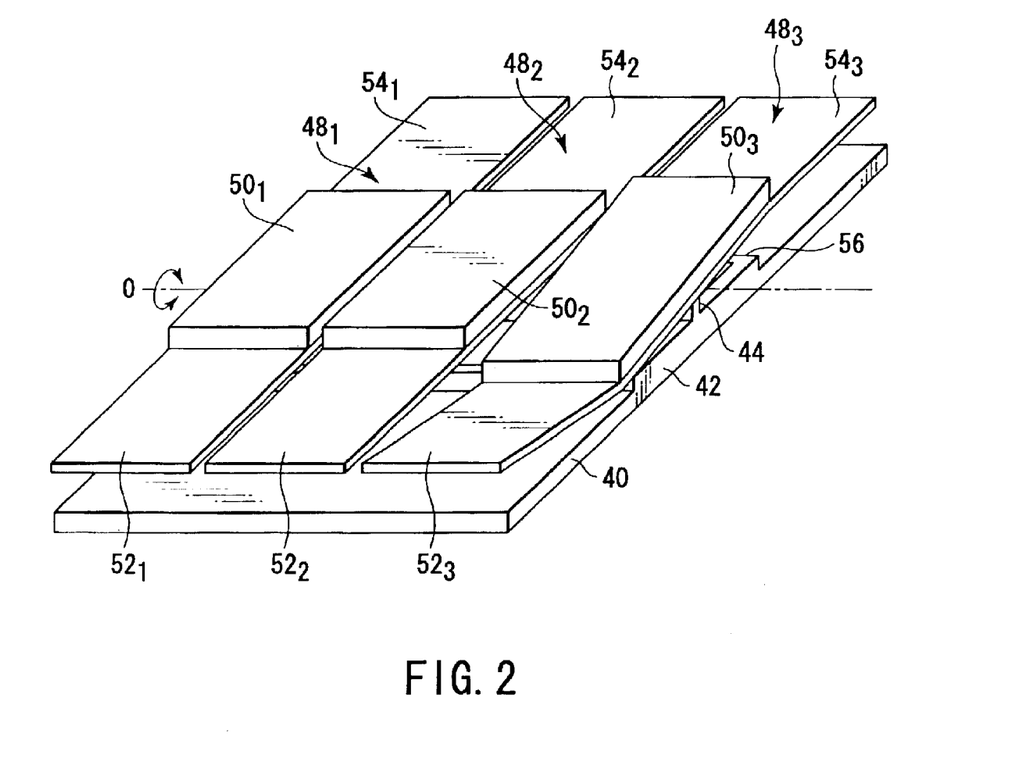
FIG. 2 is a diagram showing a schematic constitution of an optical deflector array in a first embodiment of the present invention.

FIG. 2 is a diagram showing a schematic constitution of an optical deflector array in a first embodiment of the present invention. It is to be noted that in the constitution of FIG. 2, first to third optical deflectors are shown among a plurality of optical deflectors. Moreover, only the third optical deflector is shown in a deflecting state.

In FIG. 2, movable plates $50_1$, $50_2$, $50_3$, elastic members $52_1$, $52_2$, $52_3$, and elastic members $54_1$, $54_2$, $54_3$ described later in detail are arranged in a longitudinal direction as a first direction. Moreover, a first convex portion 42 is formed in an upper surface portion of a confronting substrate 40 disposed confront to these movable plates $50_1$, $50_2$, $50_3$, elastic members $52_1$, $52_2$, $52_3$, and elastic members $54_1$, $54_2$, $54_3$. The first convex portion 42 is continuously projected/formed in a second direction (rock axis O direction) crossing at right angles to the first direction.

A second convex portion 44 is continuously projected/formed in the second direction in a middle portion of the first convex portion 42. Moreover, driving electrodes 56, 56 (see FIGS. 3A and 3B) are disposed opposite to each other via the second convex portion 44 in an upper surface portion of the first convex portion 42.

Moreover, the movable plates $50_1$, $50_2$, $50_3$, elastic members $52_1$, $52_2$, $52_3$, and elastic members $54_1$, $54_2$, $54_3$ are arranged to constitute first, second, and third optical deflectors $48_1$, $48_2$, $48_3$ above the confronting substrate 40. Furthermore, the movable plates $50_1$, $50_2$, $50_3$ are attached between the elastic members $52_1$, $52_2$, $52_3$ and elastic members $54_1$, $54_2$, $54_3$.

It is to be noted that the first convex portion 42 is formed inside outer peripheries of the movable plates $50_1$ to $50_3$. Moreover, the second convex portion 44 is positioned substantially right under the rock axis O so that the movable plates $50_1$ to $50_3$ can rotate around the shown axis O.

In this constitution, assuming that one surface of the movable plates $50_1$ to $50_3$ has a ground potential, the movable plates $50_1$ to $50_3$ are deflected by a voltage difference of voltages applied to the respective electrodes. When the voltage difference is raised, for example, the movable plate $50_1$ first contacts second convex portion 44. Furthermore, the movable plate $50_1$ in contact with an edge of the second convex portion 44 is deflected until the plate contacts the edge of the first convex portion 42. Thereafter, even when the voltage difference is enlarged, a deflection angle does not change.

Therefore, in the present constitution, the maximum deflection angle of the movable plates $50_1$ to $50_3$ is determined by the edges of the first convex portion 42 and second convex portion 44 disposed in the confronting substrate 40.

A concrete example of the optical deflector will next be described with reference to FIGS. 3A through 3E.

Figure 3A:
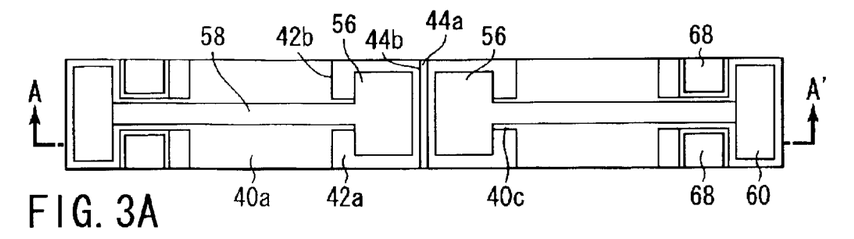
FIG. 3A is a top plan view.
Figure 3B:
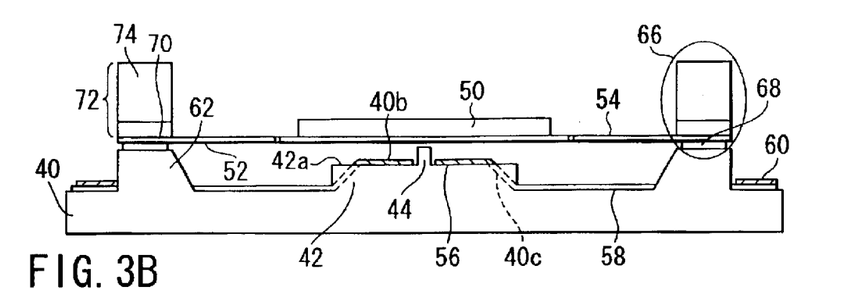
FIG. 3B is a sectional view taken along line A–A' of FIG. 3A in a static state.
Figure 3C:
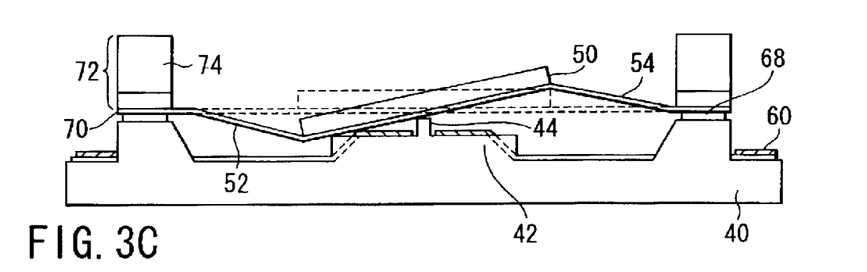
FIG. 3C is a sectional view taken along line A–A' of FIG. 3A in a driven state.
Figure 3D:
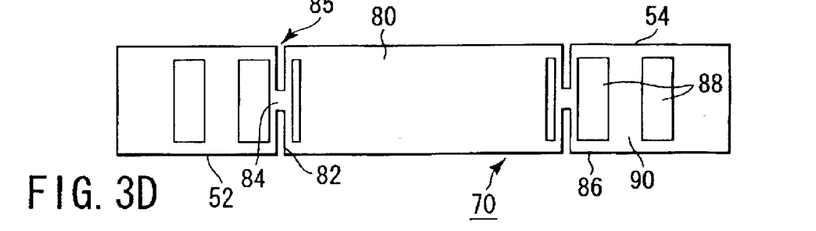
FIG. 3D is a diagram showing a surface side opposite to a confronting substrate of a movable portion.
Figure 3E:
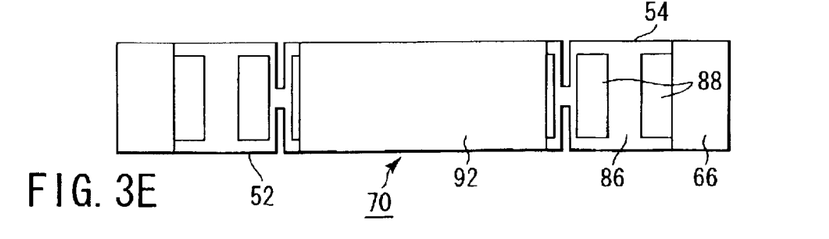
FIG. 3E is a diagram showing a mirror surface side of the movable portion.

FIGS. 3A through 3E show individual detailed constitutions of the above-described optical deflector, FIG. 3A is a top plan view, FIG. 3B is a sectional view taken along line A–A' of FIG. 3A in a static state, FIG. 3C is a sectional view taken along the line A–A' of FIG. 3A in a driven state, FIG. 3D is a diagram showing a surface side opposite to the confronting substrate of a movable portion, and FIG. 3E is a diagram showing a mirror surface side of the movable portion. Additionally, in FIG. 3A, for ease of description, the movable plate 50, elastic members 52, 54, and support member 66 in FIGS. 3B, 3C are not shown.

It is to be noted that one of a plurality of optical deflectors constituting the optical deflector array will be described hereinafter.

The optical deflector is manufactured using the lower confronting substrate 40, and a silicon on insulator (SOI) wafer (upper substrate) 72.

For the confronting substrate 40, monocrystal silicon is used as the substrate. The silicon substrate is partly removed/processed to first prepare the second convex portion 44, and further processed to prepare the first convex portion 42. A first convex surface 42a as the upper surface portion of the first convex portion 42 including the second convex portion 44 is formed to be slightly smaller than the surface of the movable plate 50 disposed opposite to the first convex surface 42a (see FIG. 3B).

Furthermore, an insulating film (not shown) is formed on the whole surface of the confronting substrate 40 disposed opposite to the upper substrate 72. This achieves insulation of the confronting substrate 40 from the upper substrate 72.

The driving electrodes 56 are disposed via the second convex portion 44 in the first convex surface 42a, that is, an electrode substrate surface 40b. Moreover, the edges of the second convex portion 44 are formed as a second edge 44b.

Furthermore, a wiring surface is formed on a substrate portion 40a extending to the end of the confronting substrate 40 from a first edge 42b of the first convex portion 42. In the wiring surface, wires 58 are formed from the respective driving electrodes 56.

The wire 58 is extended/formed from the driving electrode 56 to reach a wiring surface on the substrate portion 40a via a tapered inclined surface 40c formed by cutting a part on a first edge 42b side of the first convex portion 42. Therefore, a stepped cut of the wire in the edge can be prevented. Additionally, even when the movable plate 50 contacts the first edge 42b, short circuit does not occur. Furthermore, as the wires 58, for example, materials having high affinity such as aluminum may be selected for a semiconductor process.

A lead-out electrode 60 is disposed on the wire 58 formed to the end of the confronting substrate 40. For the lead-out electrode 60 on which a thick film is formed of a metal, the wire can be drawn outside by wire bonding. Moreover, support portions 62 are formed in the vicinity of the lead-out electrode 60 on opposite sides of the wire 58. The support portion 62 supports the upper substrate 72 which is bonded to the confronting substrate 40.

A bond surface on the support portion 62 is formed on the same plane as a second convex surface 44a as the upper surface of the second convex portion 44, and is formed by a film of gold or an alloy of gold and tin for bonding. This bonding is achieved by the metal thin film formed on the polyimide surface of the upper substrate 72 described later, and the gold tin bond by the film of the metal formed on the bond surface on the confronting substrate 40. Therefore, a conductive bond portion 68 becomes conductive.

The upper substrate 72 is prepared using the SOI wafer. The movable plate 50 is formed by a device layer of the SOI wafer 72. The upper substrate 72 further includes a polyimide layer 70 formed of polyimide. The polyimide layer 70 is formed over not only the elastic members 52, 54 but also the lower part of the movable plate 50 to the support member 66. The support member 66 is formed of the handle layer, and supports the movable plate 50 via the elastic members 52, 54.

It is to be noted that an upper part of the support member 66 is constituted by including the handle layer 74.

As shown in FIGS. 3D and 3E, the elastic members 52, 54 are formed by a leaf spring 86 extended via two bent portions 82 and connection portion 84 in a longitudinal direction (first direction) of a mirror portion 92 as a deflection surface of the movable plate 50 or a ground (GND) electrode portion 80. For example, two window portions 88, 88 are formed in the leaf spring 86. A connection plate 90 is disposed in a direction crossing at right angles to an extension direction of the leaf spring 86 between the window portions 88, 88.

When the window portion 88 is formed in the leaf spring 86, the window portion 88 is deformed and the leaf spring 86 easily elongates in the longitudinal direction. This structure is used, because an elastic member formed in a simple flat plate shape does not easily elongate.

Moreover, as shown in FIG. 3D, the metal thin film is formed on the whole back surface opposite to the surface in which the movable plate of the polyimide layer 70 is formed. This metal is preferably gold or a gold/tin alloy in consideration of bonding conditions.

It is to be noted that the present constitution is roughly constituted of the upper substrate and confronting substrate, these substrates are independently prepared, and finally they are bonded to each other via the bond portion.

An operation principle of the optical deflector constituted as described above will next be described.

In the present constitution, voltages are applied to two driving electrodes 56, and an electrostatic attraction force is generated between the electrodes and the movable plate 50 to deflect the movable plate 50. When voltage difference is applied to two driving electrodes 56, the movable plate 50 is deflected toward the electrode having the applied large voltage.

A way of deflection will be described in detail. At a voltage application start time, the movable plate 50 is deflected and entirely depressed on the confronting substrate 40 side. This is because the movable plate 50 is apart from the second convex portion 44 by thickness of the metal layer formed on the bond surface of the confronting substrate 40.

Furthermore, when the voltage is applied, the movable plate 50 contacts the second edge 44b of the second convex portion and finally contacts the first edge 42b of the first convex portion 42. Even when the voltage is further applied in this state, the deflection angle of the movable plate 50 does not change.

Therefore, for the function of the single body of the optical deflector including the present constitution, a maximum deflection angle is uniquely determined, when the movable plate 50 contacts the first edge 42b of the first convex portion 42 and the second edge 44b of the second convex portion 44. For example, the present optical deflector is used as an optical device in which only binary deflection angle is used. In this case, when the voltage necessary for the maximum deflection angle is simply applied, a stable deflection angle is constantly obtained without requiring any control mechanism.

Here, the binary deflection angle indicates, for example, maximum deflection on one driving electrode side and maximum deflection on the other driving electrode side.

Moreover, since the bent portions 82 and connection plate 90 are disposed, the elastic members 52, 54 effectively reduce the driving force of the movable plate 50 to the utmost, and selectively restrain movement in a direction other than a driving direction. This is achieved by the following function.

When the movable plate 50 is deflected, the movement of the elastic members 52, 54 depends on the movable plate 50, and symmetric deformation occurs centering on two elastic member rock axes which support the movable plate 50. At this time, the elastic members 52, 54 are bent/deformed upwards or downwards, and further pulled in a direction (first direction) crossing at right angles to the rock axis. This is caused by the elastic members 52, 54 which support the movable plate 50 on opposite sides, and increases the driving force necessary for the deflection angle of the movable plate 50.

Therefore, the bent portions 82 are disposed so as to reduce rigidity against the pull of the elastic members 52, 54 of the present constitution. For the bent portions 82, when a tensile force is exerted, a crank portion 85 formed outside the connection portion 84 opens, and rigidity of the elastic members 52, 54 against the pull can be reduced.

Moreover, the bent portions 82 are disposed in optimum positions in order to maintain the rigidity with respect to a rock axis direction (second direction) of the movable plate 50. Additionally, since the connection plate 90 is disposed between the bent portions 82 and support member 66, the rigidity with respect to a desired driving direction can be increased as compared with the rigidity with respect to the rock axis direction of the movable plate 50. Therefore, the elastic members 52, 54 in the present constitution can be inhibited from vibrating in the rock axis direction by an external force.

Furthermore, the elastic members 52, 54 for supporting the movable plate 50 are formed in the direction crossing at right angles to the rock axis O (first direction), and there is therefore an advantage that the opposite sides of the movable plate 50 in the rock axis direction can freely be used. For example, when the present constitution is used as a micro optical deflection element in a scanning type optical apparatus described in the above-described Jpn. Pat. Appln. KOKAI Publication No. 2001-116696, as shown in FIG. 4, the present optical deflectors are arrayed in one row in the rock axis direction to form the optical deflector array.

Figure 4:
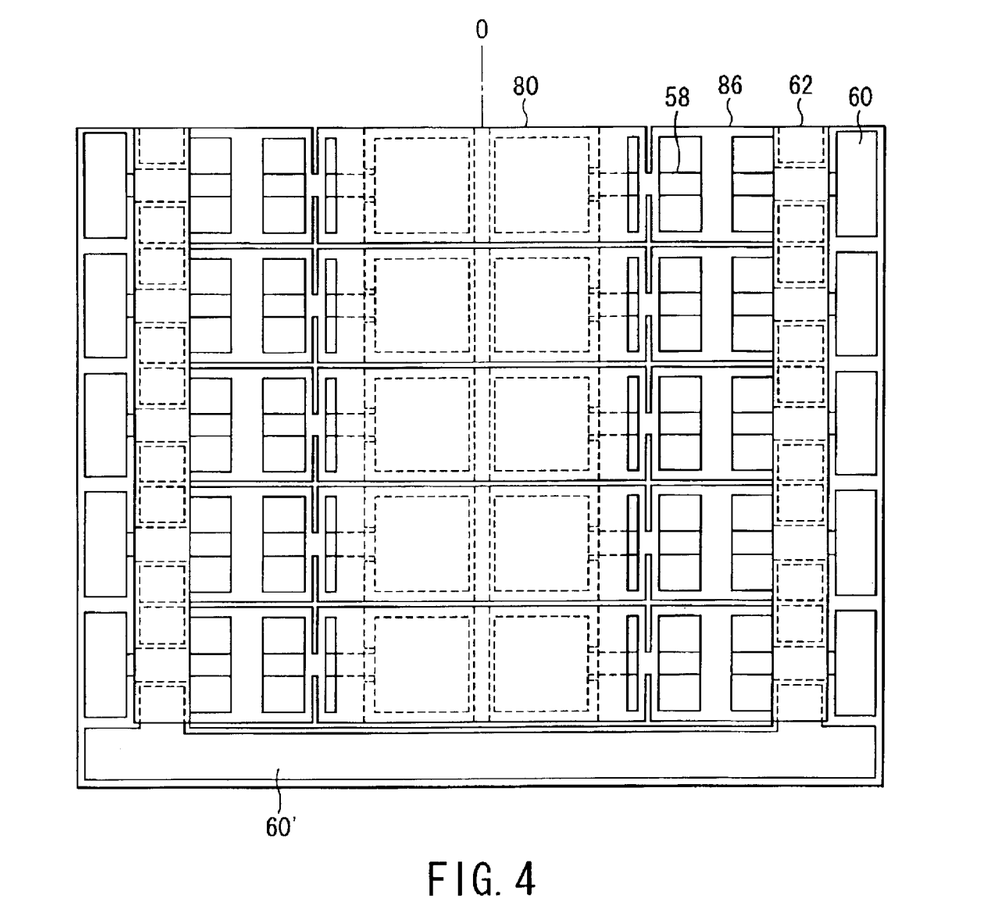
FIG. 4 is a top plan view showing a constitution of an optical deflector array in which optical deflectors constituted as shown in FIGS. 3A through 3E are arrayed in one row in a rock axis direction.

In the optical deflector array, as shown in FIG. 4, a plurality of optical deflectors, for example, five optical deflectors in this case are arranged in the direction crossing at right angles to the rock axis O.

The micro optical deflection element obtained in the Jpn. Pat. Appln. KOKAI Publication No. 2001-116696 is demanded to substantially have an interval of zero between the optical deflectors. This demand can be satisfied by the optical deflector of the present constitution.

When the optical deflectors are arrayed, the metal thin films formed on the respective movable plates are electrically conducted, and can be used as a common electrode. This indicates that a common ground can be used in a driving system using the electrostatic. attraction force. As shown in FIG. 4, only by one lead-out electrode for ground formed in the terminal end of the array can be drawn out to an external ground.

It is to be noted that each constitution of the first embodiment can naturally be modified or changed variously.

A second embodiment of the present invention will next be described.

Figure 5A:
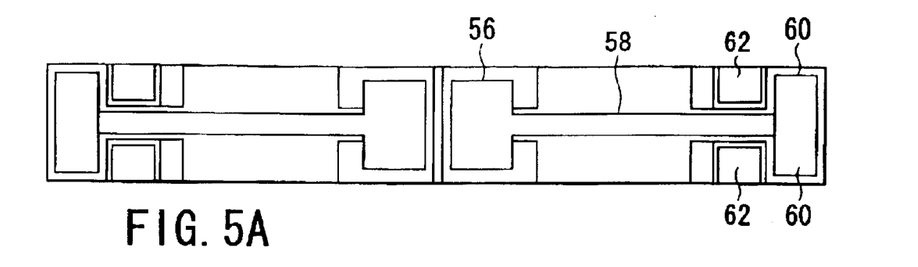
FIG. 5A is a top plan view.
Figure 5B:
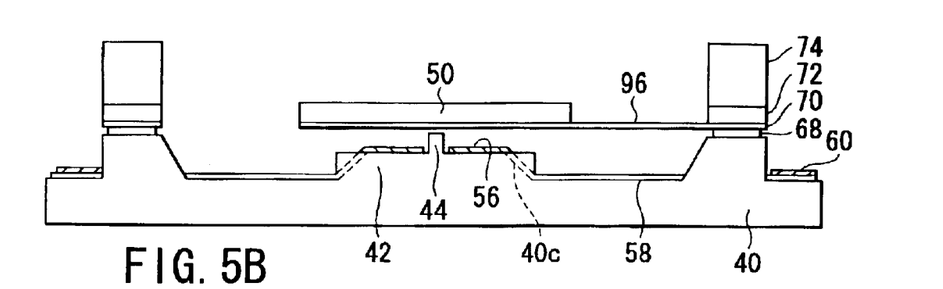
FIG. 5B is a sectional view in a static state.
Figure 5C:
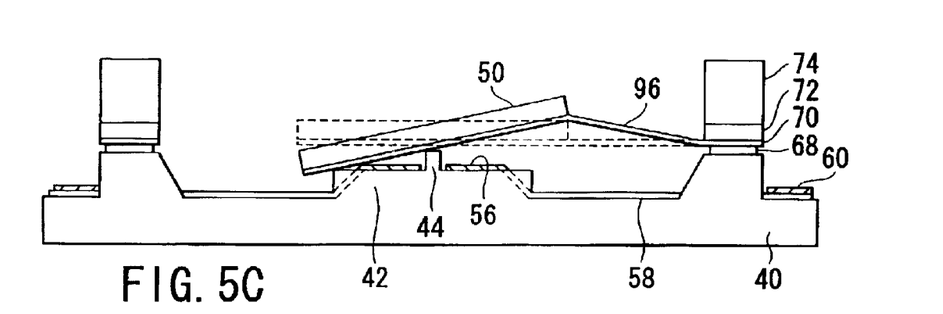
FIG. 5C is a sectional view of a state at a driving time.
Figure 5D:
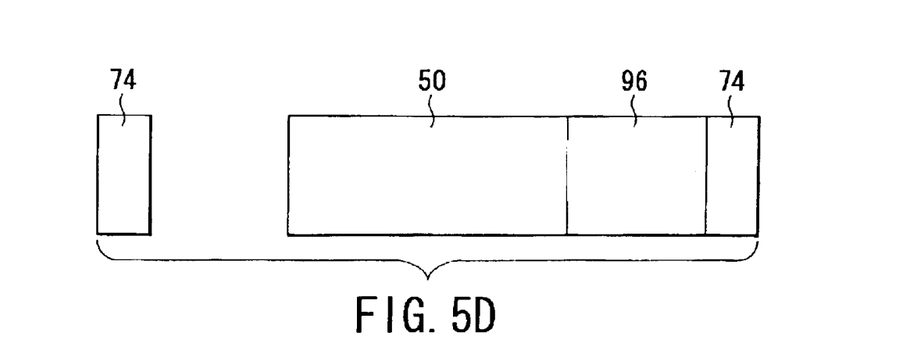
FIG. 5D is a diagram showing a mirror surface side of the movable portion.

FIGS. 5A through 5D show individual detailed constitutions of the optical deflector according to the second embodiment, FIG. 5A is a top plan view, FIG. 5B is a sectional view in a static state, FIG. 5C is a sectional view of a state at a driving time, and FIG. 5D is a diagram showing a mirror surface side of the movable portion. Additionally, in FIG. 5A, for ease of description, the movable plate 50, elastic member 96, and support member 74 in FIGS. 5B, 5C are not shown.

In the constitution of the optical deflector according to the second embodiment, the movable plate 50 includes a cantilever constitution such that the plate is supported by one elastic member 96 on one side. The second embodiment is similar to the first embodiment except that the elastic member 96 is formed of a flat plate and only one elastic member is constituted. Therefore, the same part is denoted with the same reference numerals and detailed description thereof is omitted.

In the present constitution, the movable plate 50 is supported by one elastic member 96 on one side. Therefore, the pull generated in the elastic member 96 in the direction crossing at right angles to the rock axis direction when the movable plate 50 is driven is not generated. Therefore, the bent portions described in the first embodiment is not required, and the elastic member can be constituted of the flat plate.

Moreover, since only one elastic member is used, the driving force necessary for deflecting the movable plate by the same amount is reduced, and power consumption can be reduced.

A third embodiment of the present invention will next be described.

As the third embodiment, as shown in FIGS. 6A through 6E, a constitution in which an electromagnetic force is used as the driving force is considered.

Figure 6A:
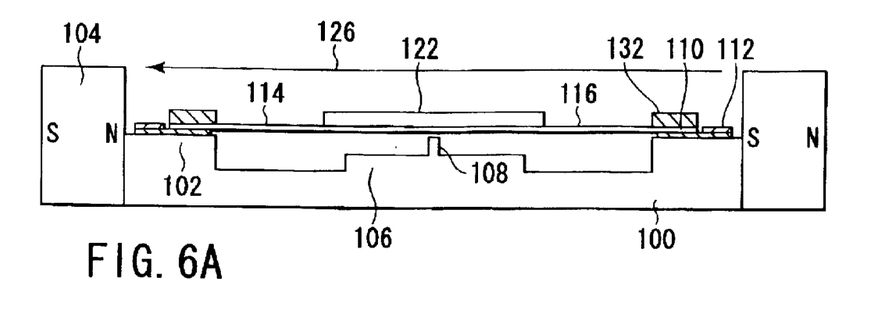
FIG. 6A is a sectional view in the static state.
Figure 6B:
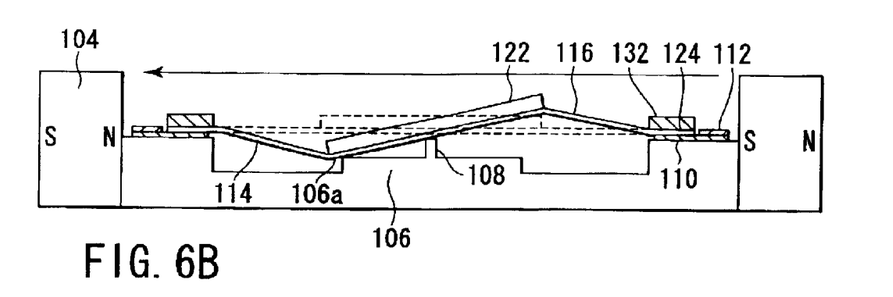
FIG. 6B is a sectional view of the state at the driving time.
Figure 6C:
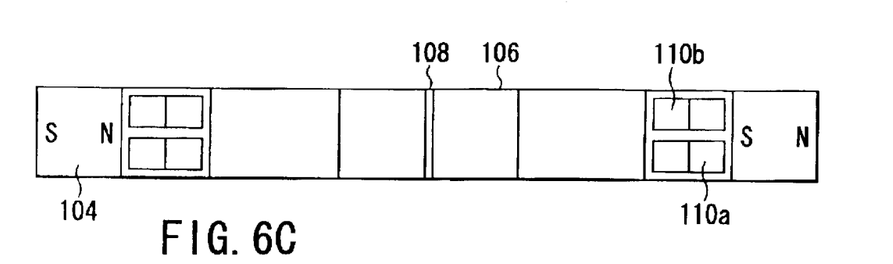
FIG. 6C is a top plan view.
Figure 6D:
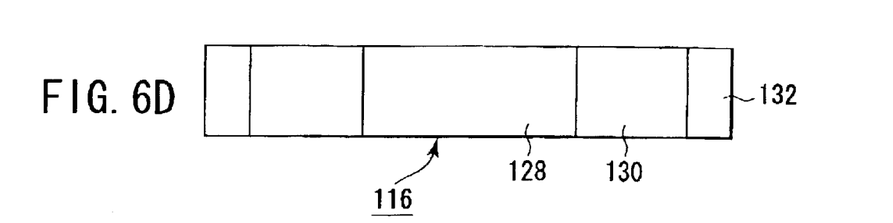
FIG. 6D is a diagram showing the mirror surface side of the movable portion.
Figure 6E:
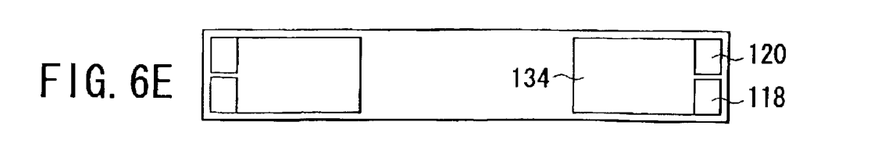
FIG. 6E is a diagram showing a surface side disposed opposite to the confronting substrate of the movable portion.

FIGS. 6A through 6E show constitutions of the optical deflector according to a third embodiment, FIG. 6A is a sectional view in the static state, FIG. 6B is a sectional view of the state at the driving time, FIG. 6C is a top plan view, FIG. 6D is a diagram showing the mirror surface side of the movable portion, and FIG. 6E is a diagram showing the surface side disposed confront to the confronting substrate of the movable portion.

A support portion 102 is formed in an end of an confronting substrate 100, and a first convex portion 106 is formed substantially in a middle portion. Moreover, a second concave portion 108 is formed in the vicinity of the rock axis of a movable plate 122 described later on the first convex portion 106. The first convex portion 106 is formed to include an end slightly inside the end of the movable plate 122. Furthermore, the edge of the first convex portion 106 forms an end contact portion 106a which contacts the deflected movable plate 122.

Moreover, permanent magnet portions 104 magnetized in the direction (first direction) crossing at right angles to the rock axis are disposed outside the support portion 102. This forms a magnetic flux line 126 crossing at right angles to the rock axis in the whole optical deflector.

An insulating film is formed on the surface of the confronting substrate 100 disposed confront to the movable plate 122. Moreover, a bond portion 110 is formed in a contact surface on the support portion 102 formed on the same plane as the convex surface of the second concave portion 108. The bond portion 110 bonds the confronting substrate 100 to an upper substrate described later. The bond portion 110 is formed by a lead-out electrode portion 110a and conductive bond film 110b. The lead-out electrode portion 110a is disposed for a lead-out electrode 112, and the conductive bond film 110b is bonded while establishing electric conduction to a coil electrode formed in the upper substrate as described later.

The upper substrate is constituted of the movable plate 122, and two elastic members 114 and 116 which are disposed opposite to each other via the movable plate 122 in order to support the movable plate 122 and a bond support portion 132, respectively. The elastic members 114 and 116 are formed of a polyimide film 124. The polyimide film 124 constitutes the elastic members 114 and 116, and is formed while two elastic members 114 and 116 are connected to each other through the movable plate 122.

On the surface side of the polyimide film 124, a mirror portion 128 is formed as the deflection surface of the movable plate 122. Moreover, the bond support portion 132 is disposed toward the end from the mirror portion 128 via a support beam portion 130.

On the other hand, on the back surface of the polyimide film 124, an electromagnetic coil 134 is formed/extended from a first coil electrode 118. The electromagnetic coil 134 is extended around on a support portion side from the rock axis of the movable plate 122, and connected to a second coil electrode 120. An electric power of the electromagnetic coil 134 can be obtained from the lead-out electrode 112 via the first coil electrode 118 and second coil electrode 120.

It is to be noted that in FIG. 6E, the electromagnetic coil 134 is extended around only one circumference. To wind the coil a plurality of times, the end of the electromagnetic coil needs to be connected to the second coil electrode by an overbridge wiring to secure insulation property from the wound electromagnetic coil.

In a driving method of the optical deflector constituted as described above, Lorentz force generated between the electromagnetic coil 134 through which a current is passed, and the permanent magnet portions 104 is used. At this time, the force generated in the electromagnetic coil 134 can be used to drive the movable plate 122 both on the confronting substrate 100 side and the opposite side (upper side in FIG. 6A). When the force is surely generated on the confronting substrate 100 side, the movable plate 122 contacts the edges of the first convex portion 106 and second concave portion 108, and the stable maximum deflection angle can constantly be obtained similarly as the first embodiment without using any control mechanism.

Moreover, when an electromagnetic driving source is used, a force larger than the electrostatic attraction force can be generated. Therefore, a large effect is obtained, when a large deflection angle is required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical deflector comprising:
   a movable plate having a reflection surface and an opposite surface opposite to the reflection surface;
   a support member including a confronting substrate which confronts the opposite surface of the movable plate;
   at least one elastic member having two ends, one end being supported by the support member and the other end being attached to the movable plate, and extending in a first direction extending from the one end to the other end; and
   driving member for driving the movable plate to rock with respect to the support member with using a second direction normal to the first direction as a rock axis,
   the confronting substrate having a contact area which defines a maximum deflection angle of the movable plate and restricts the rocking movement of the movable plate within the maximum deflection angle, and
   the contact area having a first and a second deflection position with which the movable plate is brought into contact when the driving member applies a driving force to the movable plate.

2. The optical deflector according to claim 1, wherein the contact area includes a first contact portion disposed in the vicinity of the rock axis of the movable plate, and a second and a third contact portion respectively disposed on opposite sides of the first contact portion.

3. The optical deflector according to claim 1, wherein the confronting substrate includes convexly protruded regions having edges and the first, the second and the third contact portion are individually formed of one of the edges.

4. The optical deflector according to claim 1, wherein the elastic member includes: two parallel springs supported by the support member from opposite ends of the movable plate; two bent portions disposed inside the two parallel springs and connected to each other; and a connection plate which is disposed between the bent portion and support member to connect the two parallel springs to each other.

5. The optical deflector according to claim 2, wherein the elastic member includes: two parallel springs supported by the support member from opposite ends of the movable plate; two bent portions disposed inside the two parallel springs and connected to each other; and a connection plate which is disposed between the bent portion and support member to connect the two parallel springs to each other.

6. The optical deflector according to claim 3, wherein the elastic member includes: two parallel springs supported by the support member from opposite ends of the movable plate; two bent portions disposed inside the two parallel springs and connected to each other; and a connection plate which is disposed between the bent portion and support member to connect the two parallel springs to each other.

7. The optical deflector according to claim 2, wherein the movable plate has a conductive surface in at least one surface,
   the first to third contact portions are formed of insulating materials, and
   further comprising two electrodes insulated from the opposite substrate via the first contact portion are disposed on the opposite substrate.

8. The optical deflector according to claim 3, wherein the movable plate has a conductive surface in at least one surface,
   the first to third contact portions are formed of insulating materials, and
   further comprising two electrodes insulated from the opposite substrate via the first contact portion are disposed on the opposite substrate.

9. An optical deflector array wherein a plurality of optical deflectors according to claim 1 are arranged in the second direction parallel to the rock axis.

10. An optical deflector array wherein a plurality of optical deflectors according to claim 2 are arranged in the second direction parallel to the rock axis.

11. An optical deflector array wherein a plurality of optical deflectors according to claim 3 are arranged in the second direction parallel to the rock axis.

12. An optical deflector array wherein a plurality of optical deflectors according to claim 4 are arranged in the second direction parallel to the rock axis.

13. An optical deflector array wherein a plurality of optical deflectors according to claim 5 are arranged in the second direction parallel to the rock axis.

14. An optical deflector array wherein a plurality of optical deflectors according to claim 6 are arranged in the second direction parallel to the rock axis.

15. An optical deflector array wherein a plurality of optical deflectors according to claim 7 are arranged in the second direction parallel to the rock axis.

16. An optical deflector array wherein a plurality of optical deflectors according to claim 8 are arranged in the second direction parallel to the rock axis.

17. The optical deflector array according to claim 15, wherein the conductive surfaces of the movable plates are all electrically conductive.

18. The optical deflector array according to claim 16, wherein the conductive surfaces of the movable plates are all electrically conductive.

* * * * *